(12) United States Patent
Boon (10) Patent No.: US 7,385,645 B2
(45) Date of Patent: Jun. 10, 2008

(54) MAGNETIC REPULSION ACTUATOR FOR UNDERWATER CAMERA

(76) Inventor: Paul Boon, 2630-11th St., #2, Santa Monica, CA (US) 90405

( * ) Notice: Subject to any disclaimer, the term of this patent is extended or adjusted under 35 U.S.C. 154(b) by 604 days.

(21) Appl. No.: 10/906,044

(22) Filed: Feb. 1, 2005

(65) Prior Publication Data

US 2005/0168567 A1    Aug. 4, 2005

Related U.S. Application Data

(60) Provisional application No. 60/481,994, filed on Feb. 2, 2004.

(51) Int. Cl.
*H04N 5/225* (2006.01)
(52) U.S. Cl. .......................... 348/373; 348/81
(58) Field of Classification Search ................ 348/81, 348/373
See application file for complete search history.

(56) References Cited

U.S. PATENT DOCUMENTS

| | | | |
|---|---|---|---|
| 2,944,474 A | 7/1960 | Dennis | 95/11 |
| 3,680,026 A * | 7/1972 | Masuda et al. | 338/32 H |
| 3,689,759 A | 9/1972 | Dill | 240/10.69 |
| 3,860,937 A | 1/1975 | Wolfe | 354/64 |
| 3,950,719 A | 4/1976 | Maxwell | 335/205 |
| 4,792,113 A * | 12/1988 | Eidsmore | 251/65 |
| 4,793,379 A * | 12/1988 | Eidsmore | 137/614.19 |
| 5,694,621 A | 12/1997 | Dowe | 396/25 |
| 5,822,622 A | 10/1998 | Inoue | 396/27 |
| 5,977,888 A * | 11/1999 | Fujita et al. | 341/34 |
| 6,547,414 B2 | 4/2003 | Steger | 362/188 |
| 6,574,435 B1 | 6/2003 | Smith | 396/29 |
| 2002/0067425 A1 | 6/2002 | Iverson | 348/373 |
| 2006/0214756 A1* | 9/2006 | Elliott et al. | 335/306 |
| 2007/0023333 A1* | 2/2007 | Mouhebaty et al. | 210/91 |

FOREIGN PATENT DOCUMENTS

GB    2284672 A  *  6/1995

* cited by examiner

*Primary Examiner*—David Ometz
*Assistant Examiner*—Usman Khan (57) ABSTRACT

An improved means for magnetically operating push buttons and other controls on cameras in underwater housings is disclosed. The magnetic force of repulsion is employed to transmit motion through the case wall without electrical connection to the camera or sliding or twisting or flexible seals.

4 Claims, 11 Drawing Sheets

MAGNETIC REPULSION ACTUATOR FOR UNDERWATER CAMERA

REFERENCED PROVISIONAL PATENT APPLICATION

This application claims benefit of provisional patent application No. 60/481,994 "Magnetic Repulsion Actuator for Underwater Camera" submitted 2004 Feb. 02 15:25:55 SDT by Paul Boon.

BACKGROUND OF INVENTION

Cases or housings that allow conventional mechanical still or movie cameras to be used under water have been popular for many years and the details of their construction are the subject of numerous patents. Interest in similar cases for videotape and digital cameras has increased in recent years as this equipment has become less expensive and has incorporated more desirable features. Although cameras designed specifically for use under water (incorporating a waterproof case) have been manufactured, it is sometimes judged less expensive to adapt a mass-produced conventional camera for underwater use. Often, the methods used to operate a camera incorporating a case designed specifically for underwater use are similar to those used in aftermarket underwater cases or housings. In practice, the methods used for operating various controls on cameras incorporating waterproof cases as well as cases intended for adapting conventional cameras for underwater use have been observed to have shortcomings.

Some schemes for operating the controls of underwater cameras have used one or more O-ring seals that allow a metal or plastic rod to physically turn or slide and operate the camera control(s). These O-rings require regular maintenance and have frequently been observed to allow water to enter the case as a result of wear, contamination or flattening of the rubber. The likelihood of a leak increases with the number of O-rings in the case. As may be imagined, even a small amount of water is undesirable for photographic or electronic equipment.

Magnetic coupling through a waterproof case to a reed switch (or other magnetic sensing device) inside allows operation of the camera (or other equipment) controls without the need for a sliding or rotating seal and the associated risk of a leak. Generally, the operator displaces a permanent magnet movably mounted outside the waterproof case. When moved into close proximity, the field from the magnet closes the contacts of the reed switch (or activates some other magnetic sensing device) located inside the waterproof case. The reed switch (or other device) completes a circuit in the camera or operates an electric motor to accomplish the desired function. Additional complexity and expense are associated with these controls since a motor, gearing and power supply must be supplied or else the appropriate circuit in the camera must be interrupted and electrical connections installed and wiring provided to the reed switch (or other sensor) to complete the circuit.

Rotational magnetic couplings have allowed a knob turned outside the waterproof housing to rotate a control on a camera inside. Two circular arrangements of permanent magnets, one inside and one outside, transmit the rotational motion. Focus, exposure adjustment and film advancement may be accomplished on older-style cameras. Sometimes gears are incorporated to change the number of turns or amount of torque required to operate the control. This method eliminates the risk of leak associated with an O-ring but is limited in the functions it can provide.

The use of cases that are thin enough to be flexible (resembling a bag) or rigid cases which incorporate flexible parts or areas allow the mechanical operation of the camera controls within. In their simplest embodiments, the maximum depth to which these cases are useful is limited by the hydrostatic pressure exerted on the camera or the controls themselves (a shutter button continuously depressed by water pressure is an example). Mechanical solutions to this problem have been patented and incorporate internal pressurization of the case, more complicated mold designs, additional molding steps, cantilever beams and/or additional mechanical components. These solutions generally add expense and complexity and limit the minimum size of any controls, which can be operated.

It is an object of the present invention to provide a simpler, less expensive and more reliable method for operating the controls of an underwater camera. It is a further object of the present invention to provide an actuator that is small enough to use with the more numerous and smaller push button controls that are now common on various electronic cameras. It is a further object of the present invention to provide a means of mechanically operating the controls on cameras in underwater cases thus making electrical connection unnecessary. It is a further object of the present invention to provide a method for operating popular controls other than push buttons including "rockers" as well as two-axis or three-axis "control buttons". It is a further object of this invention to provide a means for operating the controls of a camera designed specifically for underwater use (Incorporating a waterproof case) in addition to a camera contained in a case or housing intended to adapt it for underwater use. Still further objects and advantages will become apparent from a consideration of the ensuing description and accompanying drawings.

DETAILED DESCRIPTION

Figure 1:
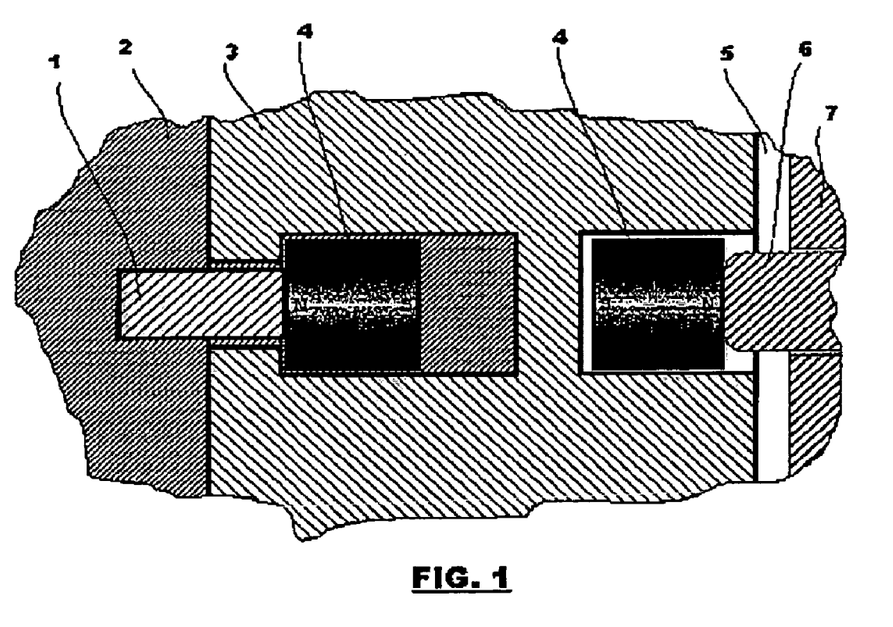
FIG. 1 is a cross sectional view of a part of a submerged camera case incorporating the preferred embodiment of the present invention.

Turning our attention to FIG. 1, we see a section of an underwater camera case 3, which is constructed from rigid non-magnetic material such as acrylic plastic. The case is submerged in water 2 and contains, in air space 5, camera 7 equipped with push button 6. Two cylindrical permanent magnets 4 are "slidably" contained in two cylindrical cavities bored into the case from opposite sides of the wall along a common centerline. The two magnets are so contained as to slide on a common axis, be separated by a waterproof barrier of rigid non-magnetic material, repel each other, and be unable to appreciably change their orientation. The cavity containing the "inner" magnet communicates with the case's interior air space and is located over the camera push button in such a way that any movement of the magnet will operate the push button. The cavity containing the "outer" magnet communicates with the water but its diameter decreases to prevent the escape of said magnet. Extension 1 has been attached to the "outer" magnet and protrudes beyond the surface of the case.

Figure 2:
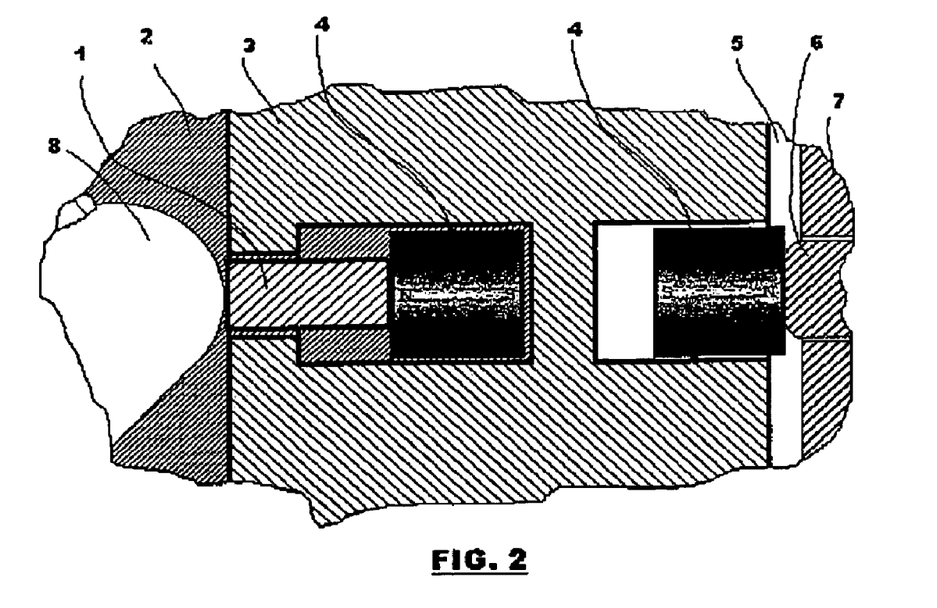
FIG. 2 is the same cross sectional view as FIG. 1 after the diver/photographer has used his finger to actuate a camera push-button.

Turning our attention now to FIG. 2, we see that the diver/photographer's finger 8 has pressed on extension 1 of the assembly from FIG. 1. This action moves the "outer" magnet and its associated magnetic field towards the "inner" magnet thus increasing the magnetic force of repulsion between the two magnets. The increased force from the "inner" magnet overcomes the designed spring force of push button 6 and the push button is depressed and accomplishes its intended camera function (shutter, power, focus etc.).

Subsequent to the operation shown in FIG. 2, removal of the diver/photographer's finger tip allows the repulsive forces of the permanent magnets and the spring forces of the camera push button to restore the assembly to the condition of FIG. 1 and ready it for another operation cycle.

Figure 3:
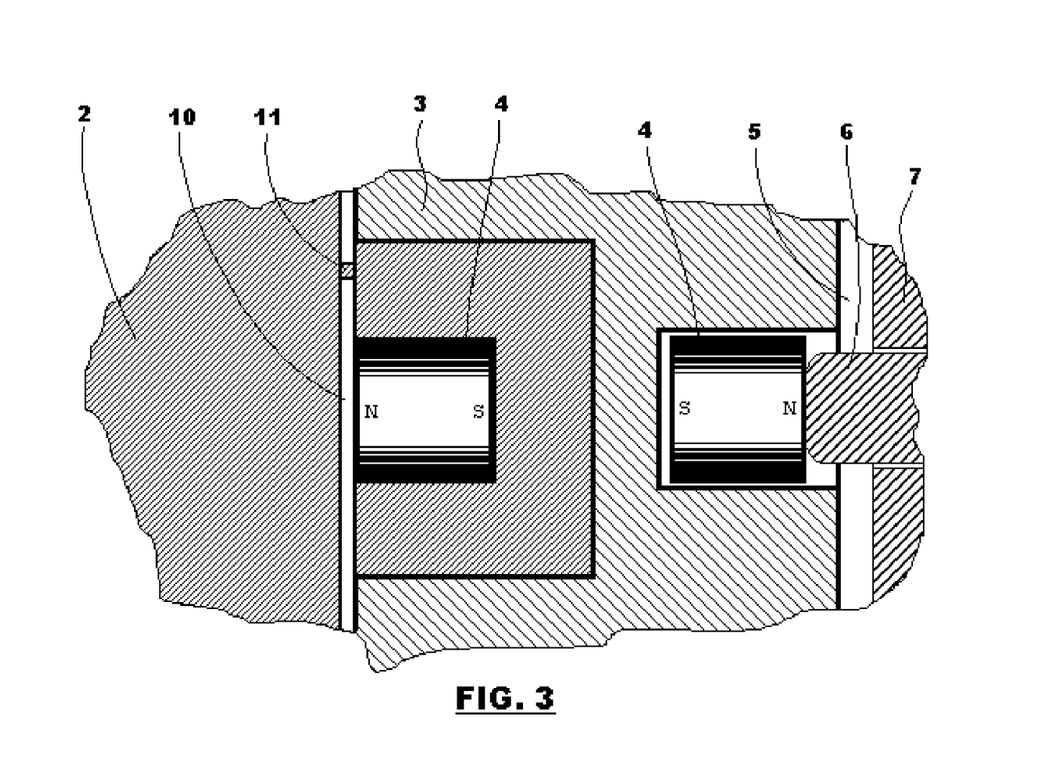
FIG. 3 is a cross sectional view of a part of a submerged camera case incorporating an alternate embodiment of the actuator depicted in FIG. 1. The outer magnet of the actuator is attached to a diaphragm of rubber or a similar material.

An alternate embodiment of the invention is shown in cross section in FIG. 3. This arrangement is similar to that shown in FIG. 1 but the "outer" cavity diameter is somewhat greater and rather than sliding within the cavity, the "outer" magnet is attached to a thin sheet or diaphragm of rubber (or similar material) 10 which has been perforated by a small hole 11 and covers the opening of the larger cavity.

Figure 4:
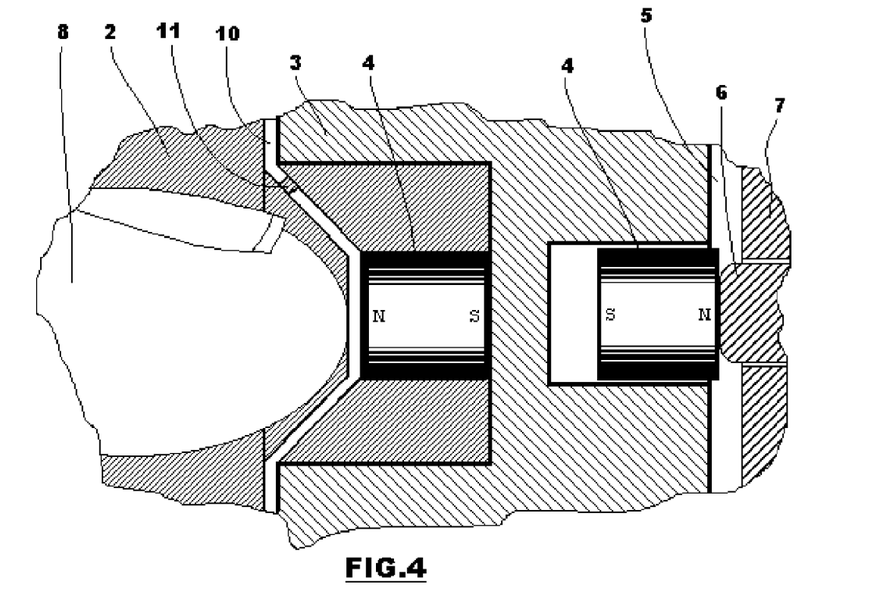
FIG. 4 is the same cross sectional view as FIG. 3 after the diver/photographer has used his finger to actuate a camera push button.

FIG. 4 shows how the diver/photographer's finger could operate the actuator illustrated in FIG. 3 by deforming the diaphragm to move the "outer" magnet and depress the camera push button. Hole 11 allows water to enter and escape from the cavity.

Figure 5:
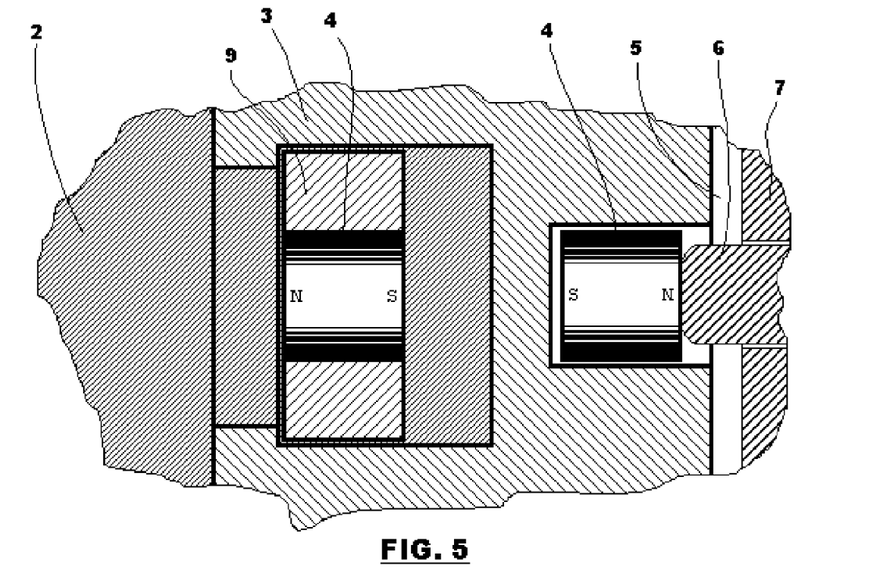
FIG. 5 is a cross sectional view of a part of a submerged camera case incorporating an alternate embodiment of the actuator depicted in FIG. 1. The outer magnet is enclosed within a larger diameter push button or plunger and slides in a larger cavity.

An alternate embodiment of the invention is shown in FIG. 5. This arrangement is similar to the one shown in FIG. 1 but extension 1 is omitted and the "outer" magnet is held in a "plunger" 9 trapped in a somewhat larger cylindrical cavity whose diameter allows the plunger to slide easily and does not prevent the entrance or escape of water. This arrangement affords protection from accidental operation, as it requires the diver/photographer to insert his finger into the cavity in order to operate the camera push button.

Figure 6:
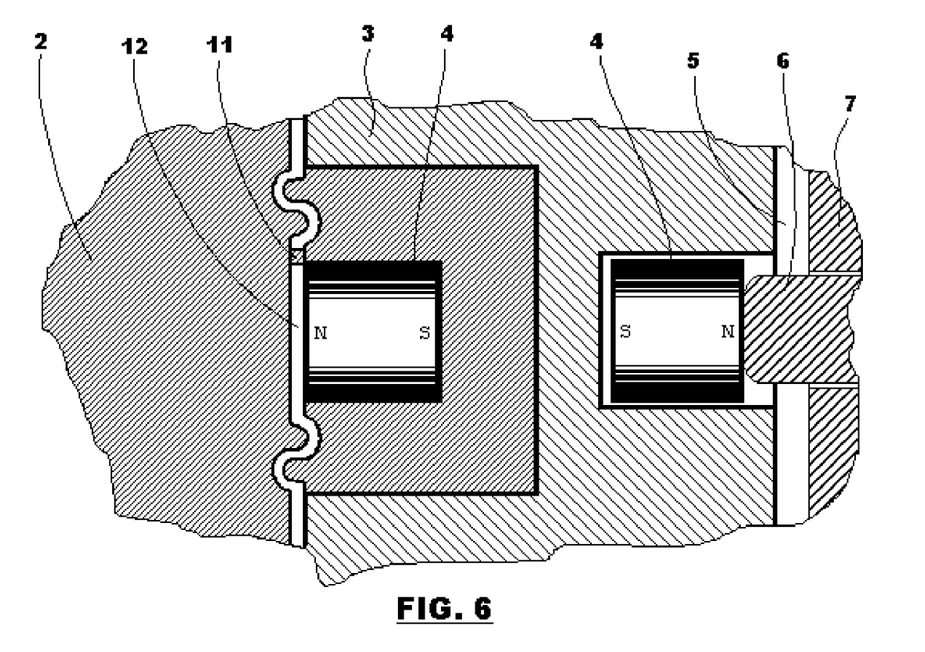
FIG. 6 is a cross sectional view of a part of a submerged camera case incorporating an alternate embodiment of the actuator depicted in FIG. 1. The outer magnet is affixed to a sheet of springy material (Metal, plastic etc.) stamped or molded in a configuration, similar to that used on some key boards, which allows it to deform and control the motion of the outer magnet.

An alternate embodiment of the invention is shown in FIG. 6. This arrangement is similar to the one shown in FIG. 1 but the "outer" magnet is attached to a springy sheet of metal or plastic (as used for some key boards) 12 which might be embossed or formed or molded into curves or bends in order to provide the desired support and movement for the magnet. Hole 11 allows water to enter and escape from the cavity.

Figure 7:
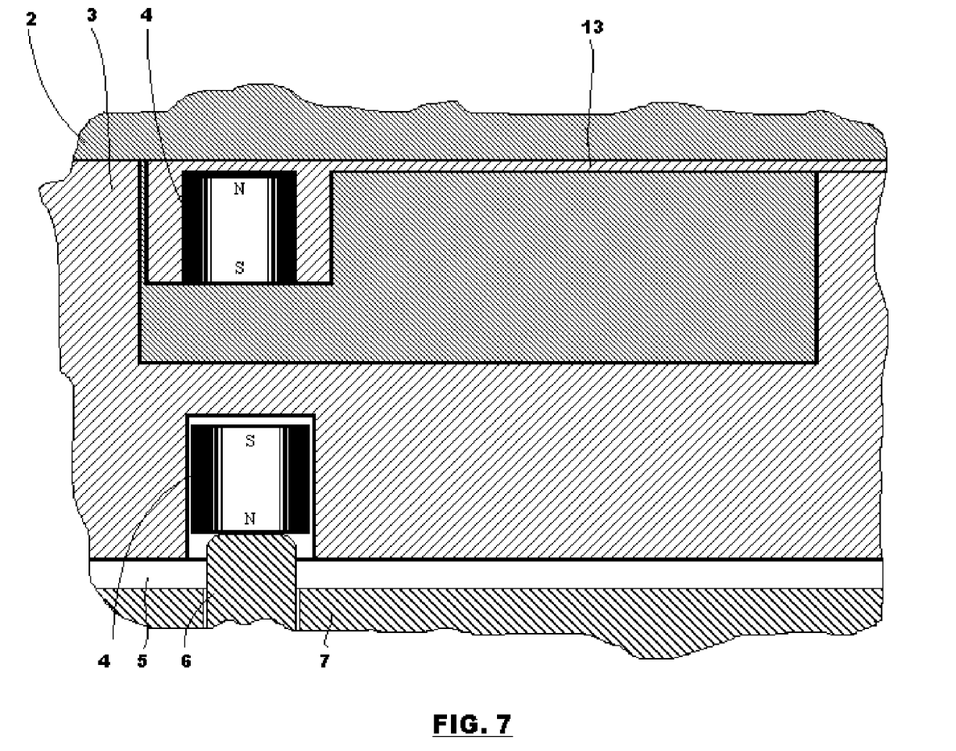
FIG. 7 is a cross sectional view of a part of a submerged camera case incorporating an alternate embodiment of the actuator depicted in FIG. 1. The outer magnet is attached to a plate of springy material such as acrylic plastic.

An alternate embodiment of the invention is shown in FIG. 7. This arrangement is similar to the one shown in FIG. 1 but the outer magnet is mounted on a spring lever 13, reminiscent of a tiny diving board, in order to provide the necessary support and movement.

Figure 8:
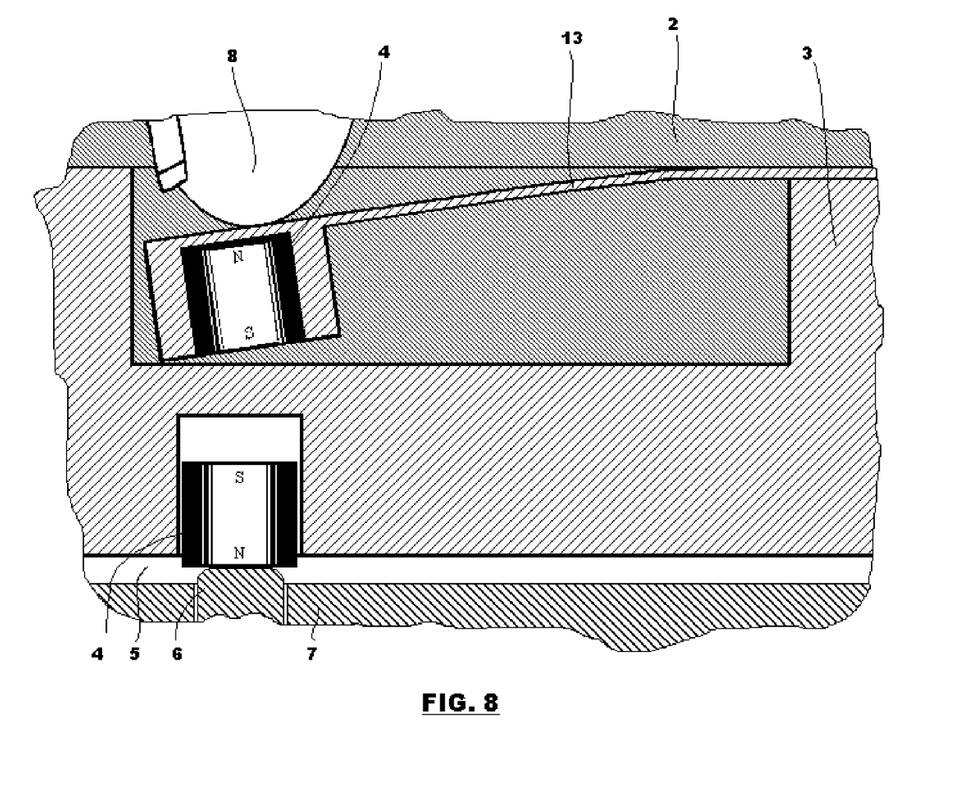
FIG. 8 is the same cross sectional view as FIG. 7 after the diver/photographer has used his finger to actuate a camera push button.

FIG. 8 shows how the diver/photographer could use his finger to depress the camera push button using the actuator illustrated in FIG. 7.

In an alternate embodiment, a pair of the previously described actuators could be used to operate the "rocker" which is now seen among the controls of various cameras. Although this embodiment is not illustrated, it would be similar to the actuator for a somewhat more complex 2-axis or 3-axis "control button" subsequently described.

Figure 9:
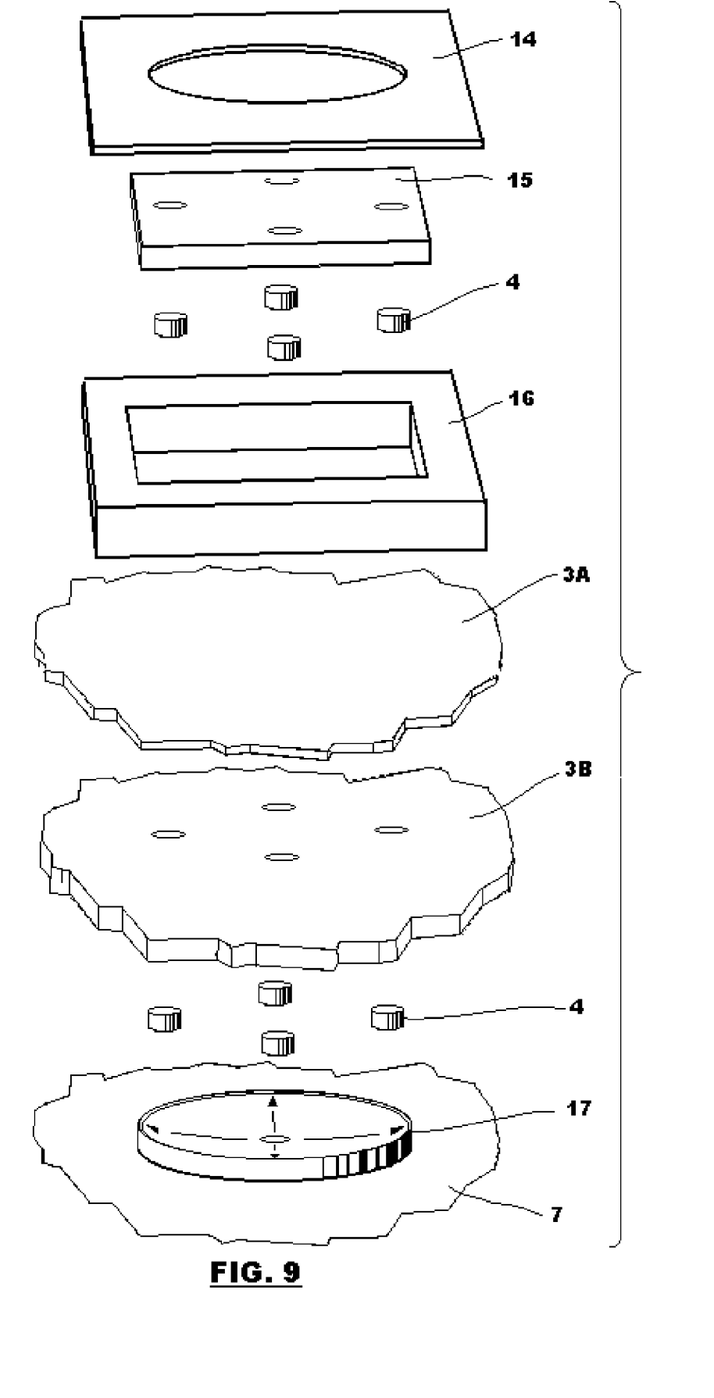
FIG. 9 is an exploded view of an actuator intended for use with a three-axis "control button" as seen on many popular digital cameras and videotape recorders.

In an alternate embodiment, 4 magnets could be located within the case's air space and 4 outside (8 magnets total) in order to operate the 3-axis or 2-axis "control button" which is now seen among the controls of various cameras. An exploded view of such an actuator on a part of a waterproof case is illustrated in FIG. 9. "Wet" control plate 15 is penetrated by 4 drilled holes where 4 magnets 4 are cemented. The "wet" control plate is trapped in the central cavity of spacer 16 by the retainer plate 14. Spacer 16 is cemented to the waterproof case, which, in this location, is composed of two laminated layers. The inner lamination 3B has been penetrated in 4 locations by drilled holes, which provide a sliding fit for the 4 "inner" magnets 4. The outer lamination 3A provides a barrier to water and pressure. A 3-axis "control button" 17 is located on camera 7.

Figure 10:
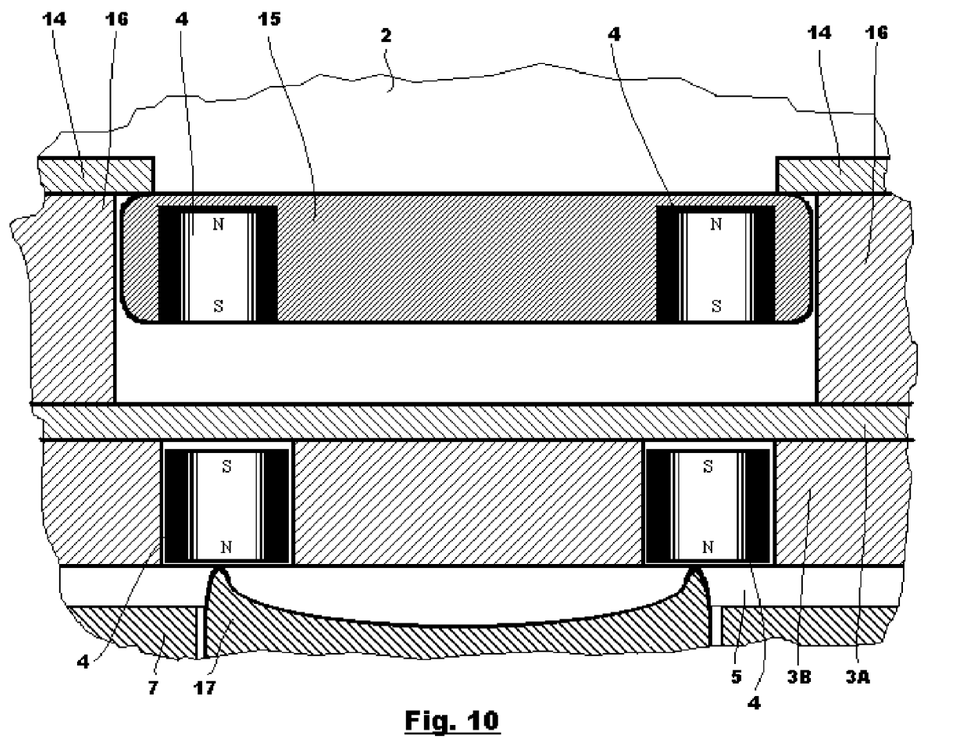
FIG. 10 is a cross sectional view of a part of a submerged camera case incorporating the assembled actuator from FIG. 9.

FIG. 10 represents a cross section of the actuator assembled from components illustrated in FIG. 9. The camera is located inside the case such that the 4 "inner" magnets are in contact or nearly in contact with the perimeter of the "control button" at the locations intended for operation. Movement of any of the 4 "inner" magnets will tilt the "control button" in one of 4 directions. Pressure from all 4 magnets will depress the "control button".

Figure 11:
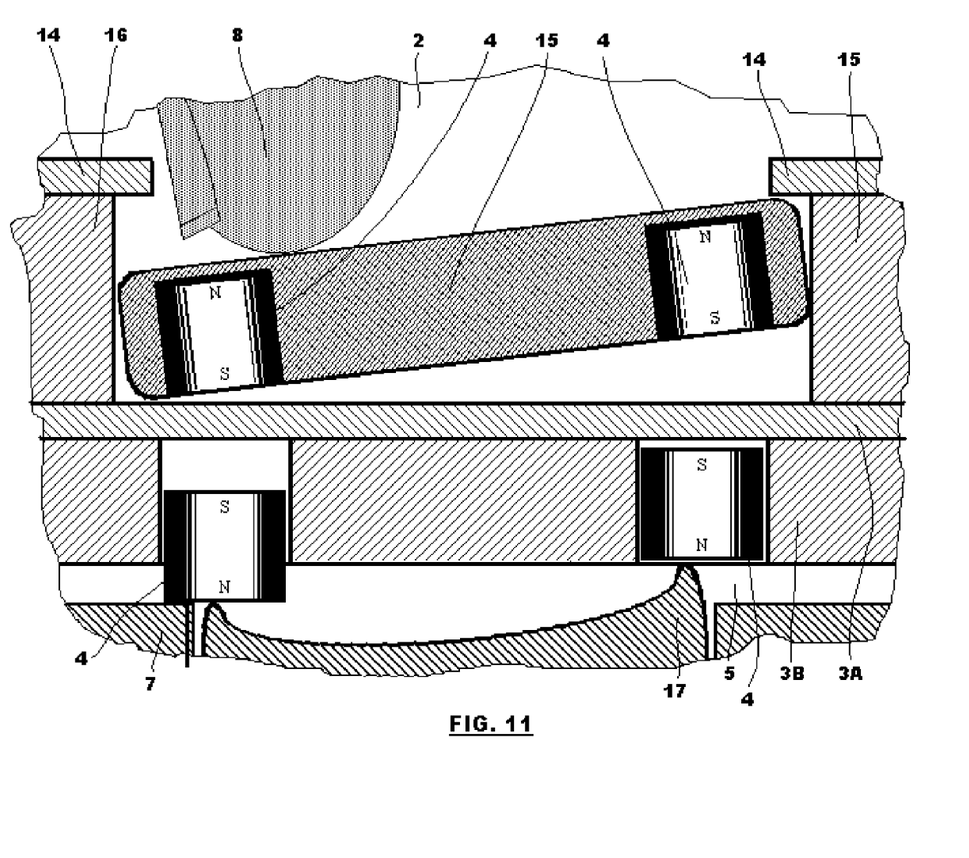
FIG. 11 is a cross sectional view of a part of a submerged camera case incorporating the actuator from FIGS. 9 and 10 after the diver/photographer has used his finger to tilt the "control button".

FIG. 11 represents a cross section of the actuator illustrated in FIGS. 9 and 10 after the diver/photographer's finger has caused the "control button" to tilt.

Figure 12:
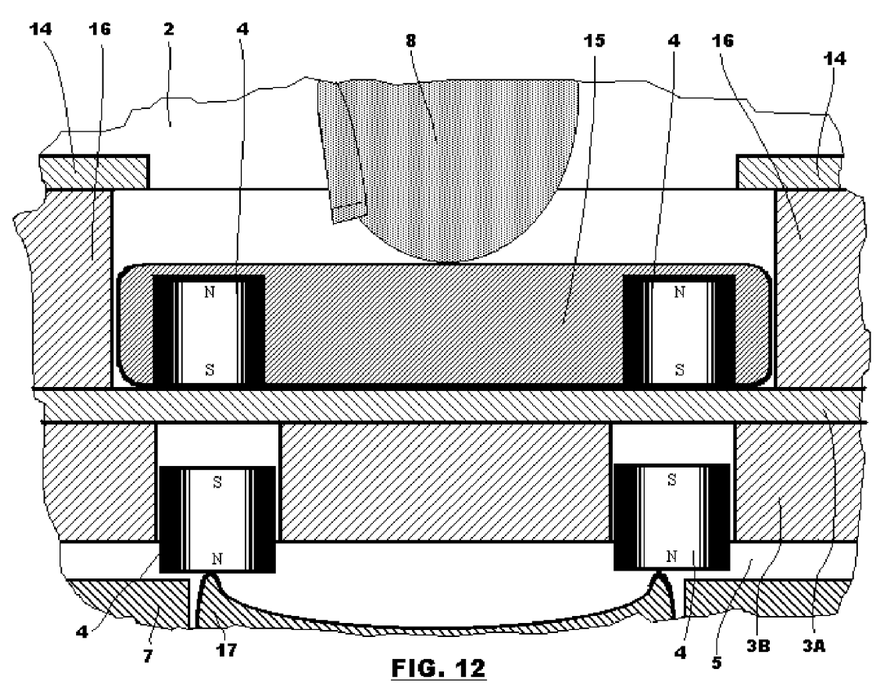
FIG. 12 is a cross sectional view of a part of a submerged camera case incorporating the actuator from FIGS. 9 and 10 after the diver/photographer has used his finger to depress the "control button".

FIG. 12 shows the actuator illustrated in FIGS. 9 and 10 in cross section after the diver/photographer's finger has caused the "control button" to be depressed.

In alternate embodiments, the magnets and their channels could have a cross-section other than cylindrical. For instance they could have a square or rectangular cross-section.

Although NdFeB magnets have been used to construct prototypes, a variety of magnetic materials might provide alternate embodiments.

Prototypes have been constructed from acrylic (Except for components where another material was noted). However, the substitution or addition of other materials including other plastics, glass, rubber, ceramic and various metals could provide alternate embodiments.

In practice, through-drilling an acrylic sheet and then laminating it to another sheet was used as an alternative to boring a flat or square bottomed hole. Additionally, casting, molding, pressing, forming, drilling, punching, cementing, welding or other methods of construction could provide alternate embodiments.

Using this invention, electronic equipment other than cameras (computer, dive computer, sound equipment, GPS etc.) could be adapted for underwater use.

In the interest of brevity, examples of alternate configurations for the support of the "outer" magnet(s) have been illustrated in order to suggest the wide variety of designs and materials and construction techniques which could provide additional alternate embodiments.

In the interest of brevity, a number of alternate configurations for the support of the "outer" magnet(s) have been illustrated or suggested while no alternatives have been illustrated or suggested for the "inner" magnet(s). Alternate embodiments could incorporate for the "inner" magnet, any of the configurations which have been illustrated or suggested for the "Outer" magnet.

It can be seen that a different number of magnets could be used without departing from the general principal of operation but providing alternate embodiments.

It can be seen that actuators for "rockers", 2-axis "control buttons" and 3-axis "control buttons" could incorporate "inner" groups of magnets or "outer" groups of magnets which are mechanically linked (For instance, embedded in a common piece of plastic or metal) or moving independently. These variations suggest a number of alternate embodiments.

In an alternate embodiment, the "outer" magnets in one or more actuators could be omitted and replaced by a single magnetic "stylus" which would be moved by the diver/photographer to actuate the desired camera control. If desired, this stylus could be attached to a tether in order to prevent loss.

Various other modifications may be made to the preferred embodiment without departing from the spirit and scope of the invention.

What is claimed is:

1. A push-button actuator for incorporation into an underwater case for photographic and/or electronic equipment comprising:
   a) a magnet within the air-space of the case and movably supported in a location and orientation near or in contact with or attached to a push-button on the photographic and/or electronic equipment such that motion in the direction of the magnet's North-South axis can actuate said push-button; b) a magnet external to the air-space of the case, movably supported in such a way that it may be deflected relative to the magnet within the case such that magnetic repulsive forces deflect the magnet within the case; c) a nonmagnetic waterproof separation between the magnet within the air-space of the case and the magnet external to the airspace of the case such that the waterproof nature of the case is maintained while repulsion between the magnets is allowed.

2. The invention of claim 1 in which the underwater case is manufactured incorporating channels or cavities for the sliding support of one or both magnets.

3. The invention of claim 1 in which the underwater case is manufactured incorporating rigid or flexible or stretching elements to allow the desired motion of both or one magnet and/or for the protection of the magnet outside of the air-space of the case from corrosion or accidental operation.

4. The invention of claim 1 in which two or more internal magnets which operate two or more functions of the photographic and/or electronic equipment are operated by one external magnet incorporated in a stylus or a sliding means.

* * * * *